United States Patent
Mallik et al.

(10) Patent No.: US 10,893,509 B2
(45) Date of Patent: Jan. 12, 2021

(54) MULTIPLE TRI-STATE HARQ PROCESSES

(71) Applicant: QUALCOMM Incorporated, San Diego, CA (US)

(72) Inventors: Siddhartha Mallik, San Diego, CA (US); Jelena Damnjanovic, Del Mar, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/012,541

(22) Filed: Feb. 1, 2016

(65) Prior Publication Data

US 2016/0234820 A1     Aug. 11, 2016

Related U.S. Application Data

(60) Provisional application No. 62/114,974, filed on Feb. 11, 2015.

(51) Int. Cl.
*H04W 72/04* (2009.01)
*H04L 1/18* (2006.01)

(52) U.S. Cl.
CPC ....... *H04W 72/0406* (2013.01); *H04L 1/1819* (2013.01); *H04L 1/1822* (2013.01); *H04L 1/1861* (2013.01); *H04L 1/1896* (2013.01)

(58) Field of Classification Search
CPC ............. H04W 72/0406; H04L 1/1896; H04L 1/1822; H04L 1/1819; H04L 1/1861
See application file for complete search history.

(56) References Cited

U.S. PATENT DOCUMENTS

| | | |
|---|---|---|
| 7,881,711 B2 | 2/2011 | Lundby |
| 8,964,788 B2 | 2/2015 | Leung et al. |

(Continued)

FOREIGN PATENT DOCUMENTS

| | | |
|---|---|---|
| CN | 101040557 A | 9/2007 |
| CN | 101326848 A | 12/2008 |

(Continued)

OTHER PUBLICATIONS

ISA/EPO, Partial International Search Report of the International Searching Authority, Int'l. App. No. PCT/US2016/016160, dated Apr. 26, 2016, European Patent Office, Rijswijk, NL, 7 pgs.

(Continued)

*Primary Examiner* — Anh Vu H Ly
*Assistant Examiner* — Hector Reyes
(74) *Attorney, Agent, or Firm* — Dalei Dong; Holland & Hart LLP

(57) ABSTRACT

Methods, systems, and devices are described for wireless communication. A transmitting device may send a signal including multiple transport blocks corresponding to multiple simultaneous hybrid automatic repeat request (HARQ) processes. Additional control information may be used to support the multiple simultaneous HARQ processes. For instance, the additional control information may indicate the number of available HARQ processes, an activity state for each HARQ process (e.g., active new data, active retransmission, or inactive), and the redundancy versions of each HARQ process. In some cases, the additional control information may be included in a downlink grant. A receiving device may respond with an acknowledgement or negative acknowledgment (ACK/NACK) for each of the transport blocks. The transmitting device may identify a retransmission status for each HARQ process based on the ACK/

(Continued)

NACKs, and transmit new redundancy versions (or new data) to the receiving device.

26 Claims, 15 Drawing Sheets

(56) References Cited

U.S. PATENT DOCUMENTS

| | | | |
|---|---|---|---|
| 2004/0125740 A1 | 7/2004 | Gardner | |
| 2007/0133458 A1* | 6/2007 | Chandra | H04L 1/0025 370/329 |
| 2008/0081651 A1* | 4/2008 | Kuroda | H04L 1/1829 455/509 |
| 2009/0225737 A1 | 9/2009 | Kim et al. | |
| 2009/0300457 A1* | 12/2009 | Kuo | H04L 1/1874 714/749 |
| 2010/0169732 A1* | 7/2010 | Wu | H04L 1/1822 714/748 |
| 2011/0003356 A1 | 1/2011 | Jain et al. | |
| 2011/0035639 A1* | 2/2011 | Earnshaw | H04L 1/1812 714/748 |
| 2012/0275395 A1* | 11/2012 | Gerstenberger | H04L 1/1854 370/329 |
| 2014/0133391 A1 | 5/2014 | Djukic et al. | |
| 2014/0153529 A1 | 6/2014 | Marinier et al. | |
| 2015/0133391 A1 | 5/2015 | De et al. | |

FOREIGN PATENT DOCUMENTS

| | | |
|---|---|---|
| CN | 101599819 A | 12/2009 |
| CN | 103973418 A | 8/2014 |
| EP | 2229032 A1 | 9/2010 |
| JP | H10145855 A | 5/1998 |
| JP | 2008505587 A | 2/2008 |
| JP | 2009540729 A | 11/2009 |
| JP | 2010502107 A | 1/2010 |
| JP | 2011510556 A | 3/2011 |
| WO | WO-2004006613 A1 | 1/2004 |
| WO | WO-2010005660 A2 | 1/2010 |
| WO | WO-2014065568 A1 | 5/2014 |
| WO | WO-2014199813 A1 | 12/2014 |

OTHER PUBLICATIONS

ISA/EP, International Search Report and Written Opinion of the International Searching Authority, Int'l. App. No. PCT/US2016/016160, dated Jul. 1, 2016, European Patent Office, Rijswijk, NL, 20 pgs.

European Search Report—EP20189442—Search Authority—Munich—dated Aug. 31, 2020.

* cited by examiner

MULTIPLE TRI-STATE HARQ PROCESSES

CROSS REFERENCES

The present Application for Patent claims priority to U.S. Provisional Patent Application No. 62/114,974 by Mallik et al., entitled "Multiple Tri-State HARQ Processes," filed Feb. 11, 2015, assigned to the assignee hereof, and expressly incorporated by reference herein.

BACKGROUND

The following relates generally to wireless communication, and more specifically to multiple tri-state hybrid automatic repeat request (HARQ) processes.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Wireless devices may utilize a hybrid automatic repeat request (HARQ) scheme to increase the reliability of a communication link. Accordingly, a transmitting device may send a transport block to a receiving device, which may respond with an acknowledgement (ACK) or a negative ACK (NACK) (i.e., an ACK/NACK) depending on whether the entire transport block has been received correctly. Upon receipt of a NACK the transmitting device may retransmit the full transport block, including information that was correctly received. This may result in a delay in sending subsequent blocks of new information and may thereby decrease throughput of the communication link.

SUMMARY

Systems, methods, and apparatuses for multiple tri-state hybrid automatic repeat request (HARQ) processes are described. A transmitting device may send a signal including multiple transport blocks corresponding to multiple simultaneous HARQ processes. Additional control information may be used to support the multiple simultaneous HARQ processes. For instance, the additional control information may indicate the number of available HARQ processes, an activity state for each HARQ process (e.g., active new data, active retransmission, or inactive), and the redundancy versions of each HARQ process. In some cases, the additional control information may be included in a downlink grant. A receiving device may then respond with an acknowledgement or negative acknowledgment (ACK/NACK) for each of the transport blocks. The transmitting device may then identify a retransmission status for each HARQ process based on the ACK/NACKs, and transmit new redundancy versions (or new data) to the receiving device.

A method of communication at a wireless device is described. The method may include identifying a state for each of a plurality of HARQ processes, transmitting a control message including an indication of the state for each of the plurality of HARQ processes, and transmitting a data signal including a plurality of transport blocks corresponding to the plurality of HARQ processes based at least in part on the control message.

An apparatus for communication at a wireless device is described. The apparatus may include means for identifying a state for each of a plurality of HARQ processes, means for transmitting a control message including an indication of the state for each of the plurality of HARQ processes, and means for transmitting a data signal including a plurality of transport blocks corresponding to the plurality of HARQ processes based at least in part on the control message.

A further apparatus for communication at a wireless device is described. The apparatus may include a processor, memory in electronic communication with the processor, and instructions stored in the memory. The instructions may be executable by the processor to identify a state for each of a plurality of HARQ processes, transmit a control message including an indication of the state for each of the plurality of HARQ processes, and transmit a data signal including a plurality of transport blocks corresponding to the plurality of HARQ processes based at least in part on the control message.

A non-transitory computer-readable medium storing code for communication at a wireless device is described. The code may include instructions executable to identify a state for each of a plurality of HARQ processes, transmit a control message including an indication of the state for each of the plurality of HARQ processes, and transmit a data signal including a plurality of transport blocks corresponding to the plurality of HARQ processes based at least in part on the control message.

Some examples of the method, apparatuses, or non-transitory computer-readable medium described above may further include processes, features, means, or instructions for receiving a NACK for a transport block of the plurality of transport blocks, and identifying a retransmission status for a HARQ process of the plurality of HARQ processes corresponding to the transport block, and the retransmission status may include a retransmission indication and a redundancy version. Additionally or alternatively, some examples may include processes, features, means, or instructions for transmitting a second control message based at least in part on the retransmission status, and transmitting a second data signal including a second plurality of transport blocks corresponding to the plurality of HARQ processes based at least in part on the second control message.

In some examples of the method, apparatuses, or non-transitory computer-readable medium described above, the state for each of the plurality of HARQ processes may include a new data indication, a retransmission indication, or an inactive indication. Additionally or alternatively, in some examples, the state for at least one of the plurality of HARQ processes comprises a redundancy version.

In some examples of the method, apparatuses, or non-transitory computer-readable medium described above, the control message may include a resource grant for the plurality of transport blocks. Additionally or alternatively, in some examples, each of the plurality of transport blocks utilizes the same modulation and coding scheme (MCS).

Some examples of the method, apparatuses, or non-transitory computer-readable medium described above may further include processes, features, means, or instructions for identifying a first set of resources for a subset of the plurality of HARQ processes associated with retransmitted data. Additionally or alternatively, some examples may include processes, features, means, or instructions for equally partitioning a second set of resources for the data signal between a plurality of transport blocks containing new data.

A further method of communication at a wireless device is also described. The method may include receiving a control message including an indication of the state for each of a plurality of HARQ processes, and receiving a data signal including a plurality of transport blocks corresponding to the plurality of HARQ processes based at least in part on the control message.

A further apparatus for communication at a wireless device is also described. The apparatus may include means for receiving a control message including an indication of the state for each of a plurality of HARQ processes, and means for receiving a data signal including a plurality of transport blocks corresponding to the plurality of HARQ processes based at least in part on the control message.

A further apparatus for communication at a wireless device is also described. The apparatus may include a processor, memory in electronic communication with the processor, and instructions stored in the memory. The instructions may be executable by the processor to receive a control message including an indication of the state for each of a plurality of HARQ processes, and receive a data signal including a plurality of transport blocks corresponding to the plurality of HARQ processes based at least in part on the control message.

A non-transitory computer-readable medium storing code for communication at a wireless device is described. The code may include instructions executable to receive a control message including an indication of the state for each of a plurality of HARQ processes, and receive a data signal including a plurality of transport blocks corresponding to the plurality of HARQ processes based at least in part on the control message.

Some examples of the method, apparatuses, or non-transitory computer-readable medium described above may further include processes, features, means, or instructions for transmitting a NACK for a transport block of the plurality of transport blocks. Additionally or alternatively, some examples may include processes, features, means, or instructions for receiving a second control message, identifying a retransmission status for a HARQ process of the plurality of HARQ processes corresponding to the transport block based at least in part on the second control message, and the retransmission status may include a retransmission indication and a redundancy version, and receiving a second data signal including a second plurality of transport blocks corresponding to the plurality of HARQ processes based at least in part on the second control message.

In some examples of the method, apparatuses, or non-transitory computer-readable medium described above, the state for each of the plurality of HARQ processes comprises a new data indication, a retransmission indication, or an inactive indication. Additionally or alternatively, in some examples, the state for at least one of the plurality of HARQ processes comprises a redundancy version.

In some examples of the method, apparatuses, or non-transitory computer-readable medium described above, the control message comprises a resource grant for the plurality of transport blocks. Additionally or alternatively, in some examples, each of the plurality of transport blocks utilizes the same MCS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
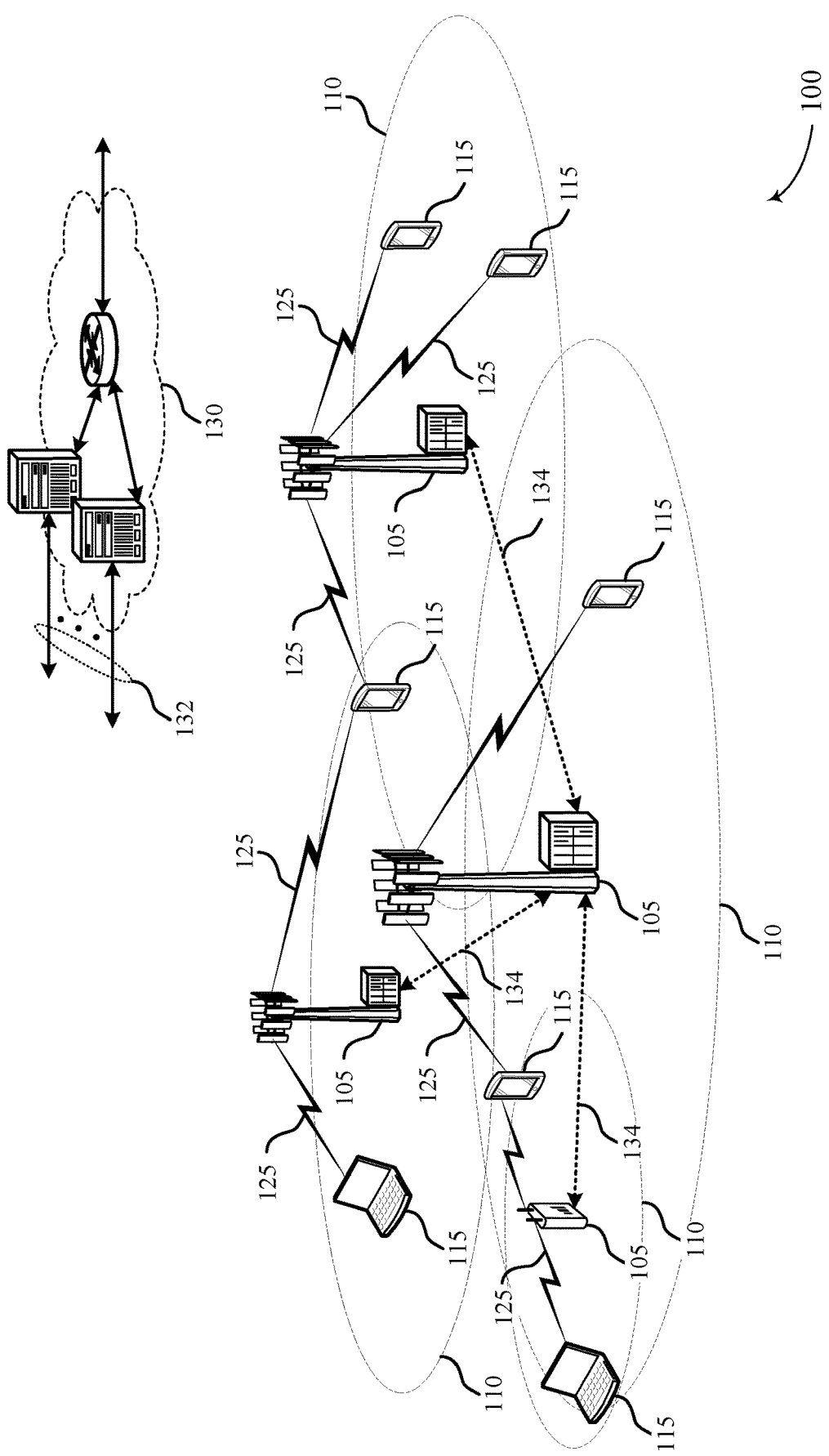
FIG. 1 illustrates an example of a wireless communications system for multiple tri-state hybrid automatic repeat request (HARQ) processes in accordance with various aspects of the present disclosure.

A transmitting device may utilize multiple hybrid automatic repeat request (HARQ) processes corresponding to multiple transport blocks to increase the throughput of a communication link. The multiple HARQ processes may be associated with additional control information. For instance, the additional control information may indicate which HARQ processes are being utilized, the activity state of each HARQ process (e.g., active new data, active retransmission, or inactive), and the redundancy version corresponding to each HARQ process. Common transmission error events may also be handled by the additional control information.

A HARQ process may include transmission of new data from a transmitting device to a receiving device. The receiving device may respond with an ACK/NACK communicating whether the transmission was correctly received. If the response is an ACK the transmitting device may send a new set of data, and if the response is a NACK the transmitting device may send a redundancy version that may be combined with the first transmission at the receiving device.

Additional signaling may support use of multiple HARQ processes. In some cases, this additional signaling may be used to signal the HARQ processes utilized by multiple transport blocks, the redundancy version corresponding to a HARQ process, and the activity state of a HARQ processes.

A device may be given a DL grant to receive data. During the DL grant the HARQ processes may be in one of three states: 1) Active: New Data, 2) Active: Retransmission 3) Inactive. A HARQ process state may be signaled to the device through the Physical Downlink Control Channel (PDCCH). In some cases, all of the HARQ processes in a DL grant may share the same modulation and coding scheme. In other cases, the HARQ processes may have different transport block sizes and if a HARQ process has multiple transport blocks, then each transport block can have a different modulation and coding scheme (MCS).

In some examples, the number of HARQ processes may be limited to some maximum, K, for instance. The number of ACK/NACKs may then also be limited to K. In some cases, in order to signal the information associated with HARQ processing, K bits may be used for the active or inactive indication. The number of bits used for the activity indication may be independent of the number of code blocks in each HARQ process. K bits may also be used to signify that a HARQ process is sending new data and not a redundant version (i.e., to signify a new data indication (NDI)). The bits used to signify an NDI may be toggled and may allow a device to distinguish between different error events. Densely packing such activity state information may enable the use of as little as K $\log_2(3)$ bits to indicate the three activity states that may occur during the HARQ process. An additional 2K bits may be used to signal the redundancy version for each code block. This may allow the redundancy versions to be sent in an arbitrary order. In some examples, a HARQ process supports several codewords (c)—e.g., c>1. In such cases, K bits may be used for each codeword in each of HARQ processes to signify that a HARQ process may send new data rather than redundant information, such that cK bits may be used.

Transport block sizes for a retransmission may follow the original transmission. The retransmission may have a different modulation and coding scheme than the original. In a given DL grant, after the resource elements (REs) utilized for retransmission have been selected, the remaining REs may be partitioned across the various active HARQ process. In one example, the remaining REs may be equally portioned among the HARQ processes with new data. Additionally or alternatively, extra signaling may be used for unequal partitioning of resources. The partitioning of the REs may determine the transport block size (TBS).

Certain error events may occur when transmitting multiple HARQ processes. Additional control information (such as the information fields described above) may be utilized to mitigate these errors. In one example, a UE may fail to decode the PDCCH. If the NDI bit is not toggled, the UE may combine the retransmission, otherwise it may clear the log likelihood ratio (LLR) buffer. In another example, the base station may fail to decode the ACK/NACK. If the NDI bit is not toggled, the UE may drop the PDSCH processing and resend the ACK/NACK, otherwise it may clear its buffers. In yet another example, a UE may fail to decode the PDSCH. If the NDI bit is not toggled, the UE may recombine the retransmission, otherwise it may clear the LLR buffer. In still another example, a UE may fail to decode the PDSCH and the base station may fail to decode the ACK/NACK. If the NDI bit is not toggled, the UE may recombine the retransmission, otherwise it may clear the LLR buffer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. The base stations 105 may be configured to employ multiple tri-state HARQ process in communications with UEs 115. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 may be dispersed throughout the wireless communications system 100, and each UE 115 may be stationary or mobile. Moreover UEs 115 may be configured to employ multiple tri-state HARQ process in communications with base stations 105. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced CCs (eCC). An eCC may be characterized by features, including: flexible bandwidth, variable length TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a variable TTI length and symbol duration. In some cases an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In other examples, the numerology of resources of the eCC may be different from numerology of another CC, which may employ TTIs defined in a version or release of, for example, a particular LTE standard.

Flexible bandwidth and variable TTIs may be associated with a modified control channel configuration—e.g., an eCC may utilize an enhanced physical downlink control channel (ePDCCH) for DL control information, which may perform some of the functions of the PDCCH described below. In some cases, control channels of an eCC may utilize frequency division multiplexed (FDM) control channels to accommodate flexible bandwidth or UEs 115 having differing bandwidth capabilities. Other control channel modifications may include the use of additional control channels— e.g., for eMBMS scheduling or to indicate the length of variable length UL and DL bursts—or control channels transmitted at different intervals. An eCC may also include modified or additional HARQ related control information. For instance, an eCC may support communications utilizing multiple tri-state HARQ processes.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

HARQ may be a method of ensuring that the transport block and the contained data are received correctly over a wireless communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor radio conditions. In other cases, redundancy bits are not added to each transmission, but are retransmitted after the transmitter of the original message receives a NACK indicating a failed attempt to decode the information. If a portion of the transport block is not sent correctly the receiving device may respond to the transmitting device with a NACK. After receiving a NACK the base station 105 may re-transmit the entire transport block, including correctly decoded information, and each retransmission of a transport block may be considered a subsequent redundancy version (RV) (i.e., a new transport block is RV 0, a first retransmission of the transport block is RV 1, etc. . . . ). If the redundancy version exceeds a threshold the base station 105 may abandon transmission of the transport block, and send the transport block back to the RLC to start the process over.

In some cases, a base station 105 may utilize a stop-and-wait transmission technique in which the base station 105 waits for an acknowledgement from a UE 115 before sending new data or a re-transmission of a transport block. This process may occur according to pre-determined time intervals and in some cases a transmitter may wait up to 8 ms between a first and subsequent transmission—e.g., there may be up to 7 subframes between the two transmissions. Therefore, if a portion of a transport block, corresponding to a HARQ process, is incorrectly received the transmitter may wait up to 8 ms to retransmit the entire transport block, including the correctly received portions of the transport block. In other examples, such as for eCCs utilizing low latency operations—e.g., TTIs have a duration of an LTE release 8 symbol period—HARQ latency may be less than a subframe.

In order to fully utilize all of the subframes, or TTIs, a transmitter may use multiple hybrid ARQ processes (e.g., up to 8 processes). In some systems, only one HARQ process is utilized for each transmission and a transmitter may send a different number of redundancy versions for alternating HARQ process depending on channel conditions (e.g., HARQ process 1 may contain RV 2, HARQ process 2 may contain RV 1, and HARQ process 3 may contain RV 0). It may be important for the base station 105 and UE 115 keep track of the HARQ process, the redundancy version, and new data indicators to ensure proper (e.g., in-order) receipt of the transport blocks and data.

According to the present disclosure, a base station 105 may send a signal including multiple transport blocks corresponding to multiple simultaneous HARQ processes. Additional control information may be used to support the multiple simultaneous HARQ processes. For instance, the additional control information may indicate the number of available HARQ processes, an activity state for each HARQ process (e.g., active new data, active retransmission, or inactive), and the redundancy versions of each HARQ process. In some cases, the additional control information may be included in a downlink grant. A UE 115 may then respond with an acknowledgement or negative acknowledgment (ACK/NACK) for each of the transport blocks. The base station 105 may then identify a retransmission status for each HARQ process based on the ACK/NACKs, and transmit new redundancy versions (or new data) to the UE 115.

Figure 2:
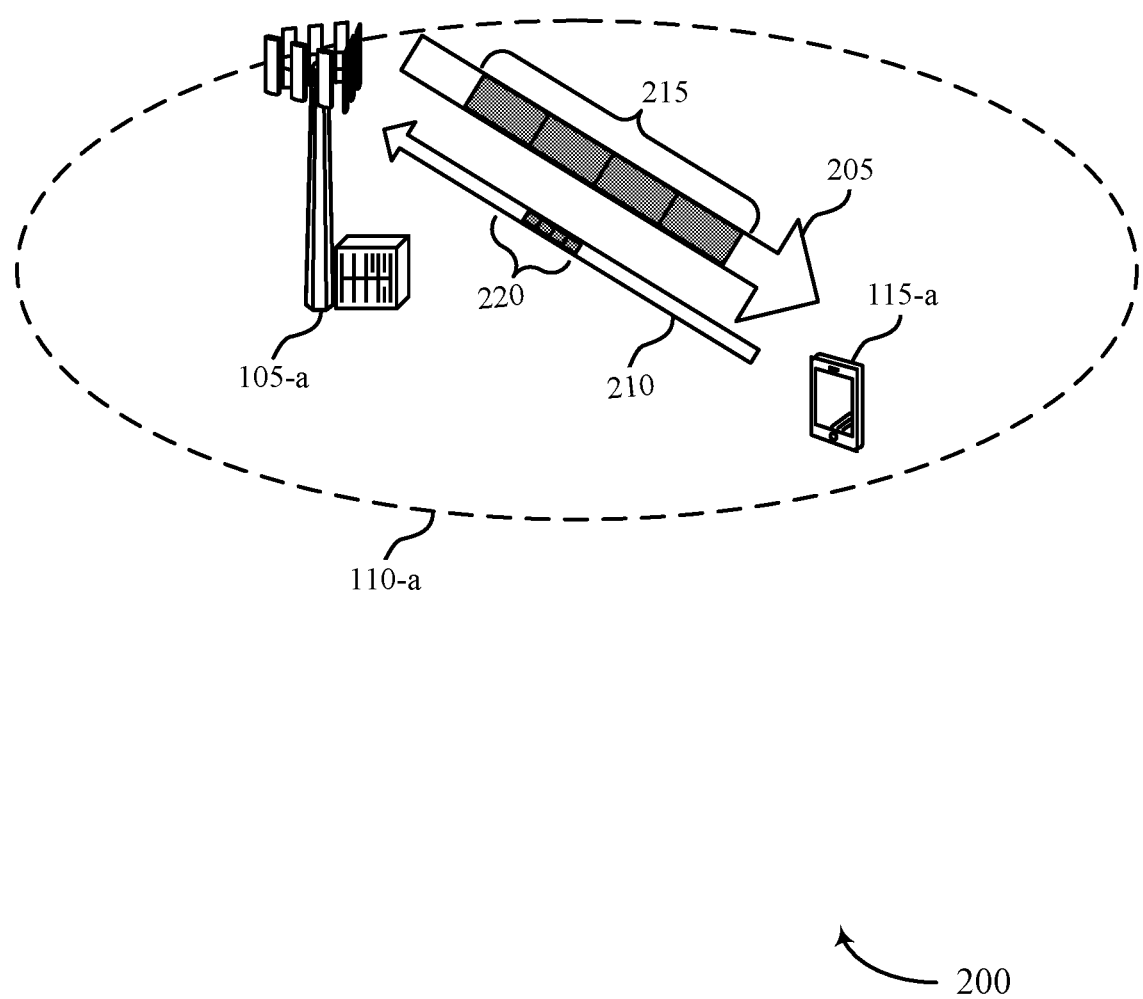
FIG. 2 illustrates an example of a wireless communications system for multiple tri-state HARQ processes in accordance with various aspects of the present disclosure.

FIG. 2 illustrates an example of a wireless communications system 200 for multiple tri-state HARQ processes in accordance with various aspects of the present disclosure. Wireless communications system 200 may include UE 115-a and base station 105-a, which may be examples of a UE 115 and a base station 105, respectively, described above with reference to FIG. 1. Base station 105-a and UE 115-a may communicate with one another via downlink 205 and uplink 210 when UE 115-a is within coverage area 110-a, as generally described above with reference to FIG. 1. Downlink 205 may include a set of transport blocks 215 and uplink 210 may include individual or group ACK/NACKs 220. The set of transport blocks 215 may utilize multiple HARQ processes, which may be associated with an additional HARQ signaling payload.

In some systems, a wireless device using HARQ may utilize only one HARQ process per transmission. In some examples, however, a wireless device such as base station 105-a may transmit multiple transport blocks each utilizing a respective HARQ process to increase the throughput of the communication link. Additional control information may indicate the status of the HARQ process, the redundancy version corresponding to each HARQ process, and the activity state of each HARQ process. As mentioned above, in some cases, a HARQ process may be in one of three activity states: Active—New Data, Active—Retransmission, or Inactive.

For example, base station 105-a may transmit a set of transport blocks 215 that utilize multiple HARQ processes either subsequent to or simultaneously with a DL grant. UE 115-a may receive the DL grant, which may include additional signaling to support the transmission of the transport blocks corresponding to multiple HARQ processes. For instance, the DL grant received by UE 115-a may include control information indicating the activity state of available HARQ processes, the correspondence between transport blocks and HARQ process, and the corresponding redundancy versions. The HARQ states, in addition to the redundancy version of each HARQ process, may be communicated through a HARQ indicator. The HARQ indicator may be included with the DL grant and may be signaled to UE 115-a through the Physical Downlink Control Channel (PDCCH).

Additional bits in the PDCCH (or in another control message) may be used to indicate the status of the multiple HARQ processes. For example, a HARQ indicator field may include K bits to indicate if the HARQ process is in the active or inactive state. The number of bits used for the activity indication may be independent of the number of code blocks in each HARQ process. K bits may also be used to signify that a HARQ process is sending new data and not a redundant version (e.g., to signify a new data indication (NDI)). The bits used for an NDI may be toggled and may allow a device to distinguish between different error events. This may result in a total of 2K bits used to indicate the activity state and NDI indicator. In some cases, activity status and the NDI indicator for K HARQ processes may be represented in fewer than 2K bits—e.g., efficient packing may enable the use of as few as K log$_2$ (3) bits. Additionally, 2K additional bits may be used to signal the redundancy version for each HARQ process. This may allow the redundancy versions to be sent in an arbitrary order.

Figure 3:
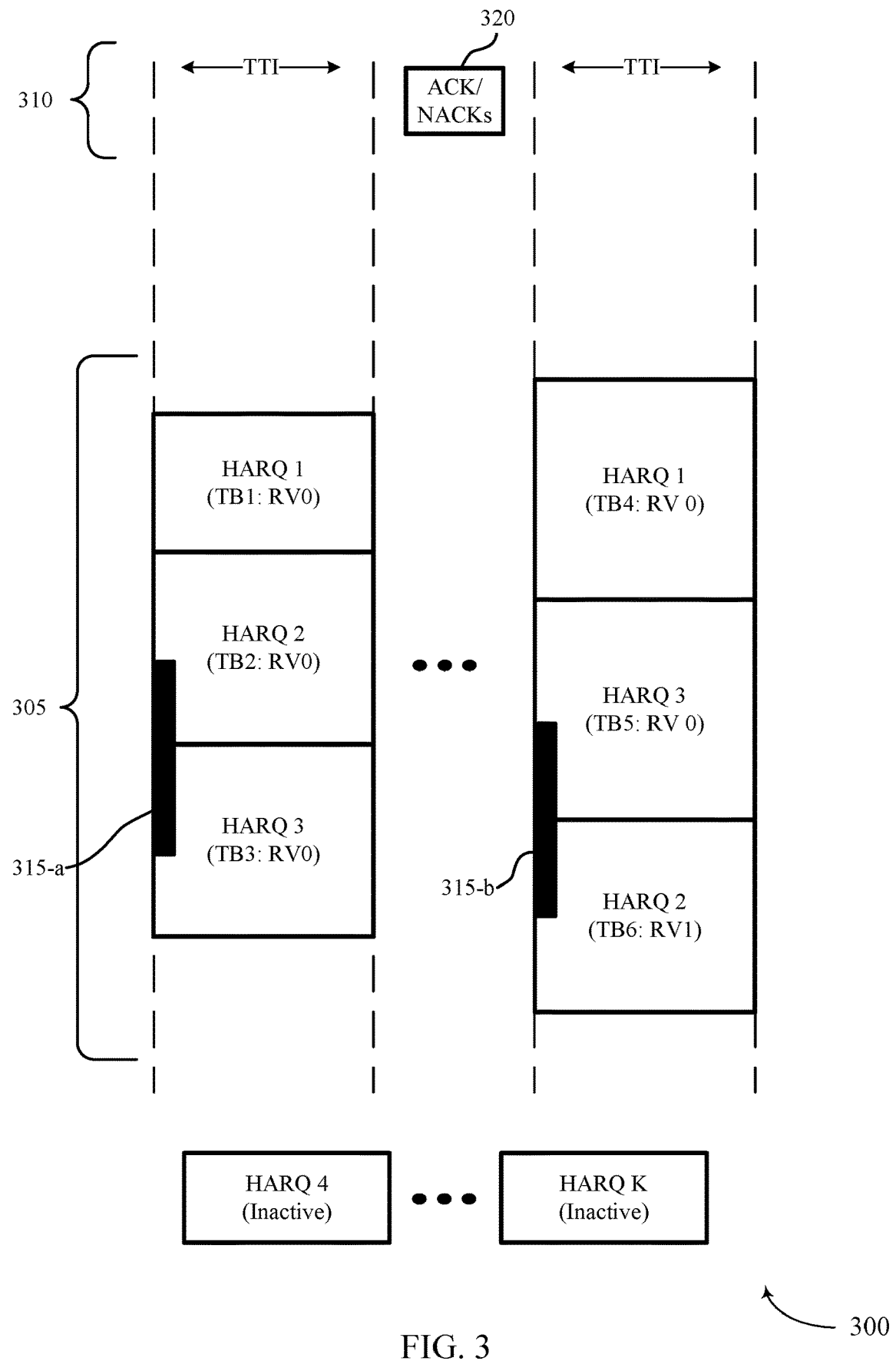
FIG. 3 illustrates an example of a communications structure for multiple tri-state HARQ processes in accordance with various aspects of the present disclosure.

FIG. 3 illustrates an example of a communications structure 300 for multiple tri-state HARQ processes in accordance with various aspects of the present disclosure. Communications structure 300 may illustrate aspects of a transmission between a UE 115 and a base station 105, as described above with reference to FIGS. 1 and 2. Communications structure 300 may include HARQ Processes 1 through K, in addition to redundancy versions 1 through N. HARQ processes 1 through K may correspond to up to K transport blocks. The set of transport blocks may be transmitted within a transmission time interval (TTI). First DL grant 315-a and second DL grant 315-b may include HARQ indication information so that a UE 115 may decode the transport block. In some examples, a set of ACK/NACKs 320 may be transmit by a UE 115 through uplink 310 while the set of transport blocks may be transmitted by a base station 105 through downlink 305.

In one example, a base station 105 may send a DL grant 315 to a UE 115. This grant may alert the UE 115 of forthcoming data transmissions and communicate to the UE 115 how a data signal will be sent. The DL grant 315 may include information about frequency resources used, the amount of data being sent, and the allocation and modulation scheme used for the set of transport blocks. The DL grant 315 may also include control information used to indicate the activity state of the available HARQ processes, the partitioning of one or more transport blocks across the downlink resources, how a transport block corresponds to a HARQ process, and the redundancy version associated with a HARQ process for a TTI. The base station 105 may transmit transport blocks based on the first DL grant 315-a via downlink 305. Each transport block may correspond to one of the K HARQ processes. In one example, HARQ processes HARQ 1 through HARQ 3 are active, while HARQ 4 through HARQ K are inactive. In some cases, the transmission may be an initial data transmission and therefore each transport block may include new data as indicated by redundancy version 0 (e.g., TB1: RV0, TB2: RV0, TB3: RV0). In some cases, the base station 105 may wait some duration (e.g., one or more TTIs) for a UE 115 to respond with a corresponding set of ACK/NACKs 320 after transmitting. In some cases, the ACK/NACK response may be received during the same TTI as the corresponding data transmission. The set of ACK/NACKs 320 may communicate to the base station the successful or unsuccessful receipt and decoding of the set of transport blocks.

In the example of FIG. 3, HARQ processes HARQ 1 and HARQ 3 may represent successful transmission and reception of the new data included in transport blocks TB1 and TB3 at a UE 115, while HARQ 2 may experience an error event preventing a successful decoding—e.g., a failed cyclic redundancy check (CRC). The base station 105 may determine which HARQ processes indicate unsuccessful transmissions based on ACK/NACKs 320—e.g., which transport blocks correspond to NACKs—and may allocate resources for transmitting redundancy versions of the corresponding transport blocks. After the resources have been allocated to retransmissions, the remaining resource elements may be partitioned across one or more active HARQ process used for new data transmissions. In some cases, the remaining resource elements are equally partitioned among the HARQ processes with new data. In other cases, the resource elements may be unequally partitioned. This allocation of resource elements across HARQ processes may determine the size of the set of transport blocks. In some cases, additional HARQ processes may be activated, or active HARQ process may be deactivated (not shown).

Once the resources have been allocated, the base station 105 may send a second DL grant 315-b indicating how the second set of transport blocks may be sent. For example, the second DL grant 315-b may allocate a second set of frequency resources to the second set of transport blocks. The second set of frequency resources may be different from the previous set of frequency resources, or the second set of transport blocks may be ordered differently from the previous transmission. A retransmission—e.g., a transmission of a redundancy version—may share the same transport block size as the original transmission, and may be retransmitted with either the same or a different modulation and coding scheme (MCS). The UE 115 may again respond with a set of ACK/NACKs and the base station may again determine successful and unsuccessful HARQ transmissions before transmitting redundant and new data in a subsequent transmission.

Figure 4:
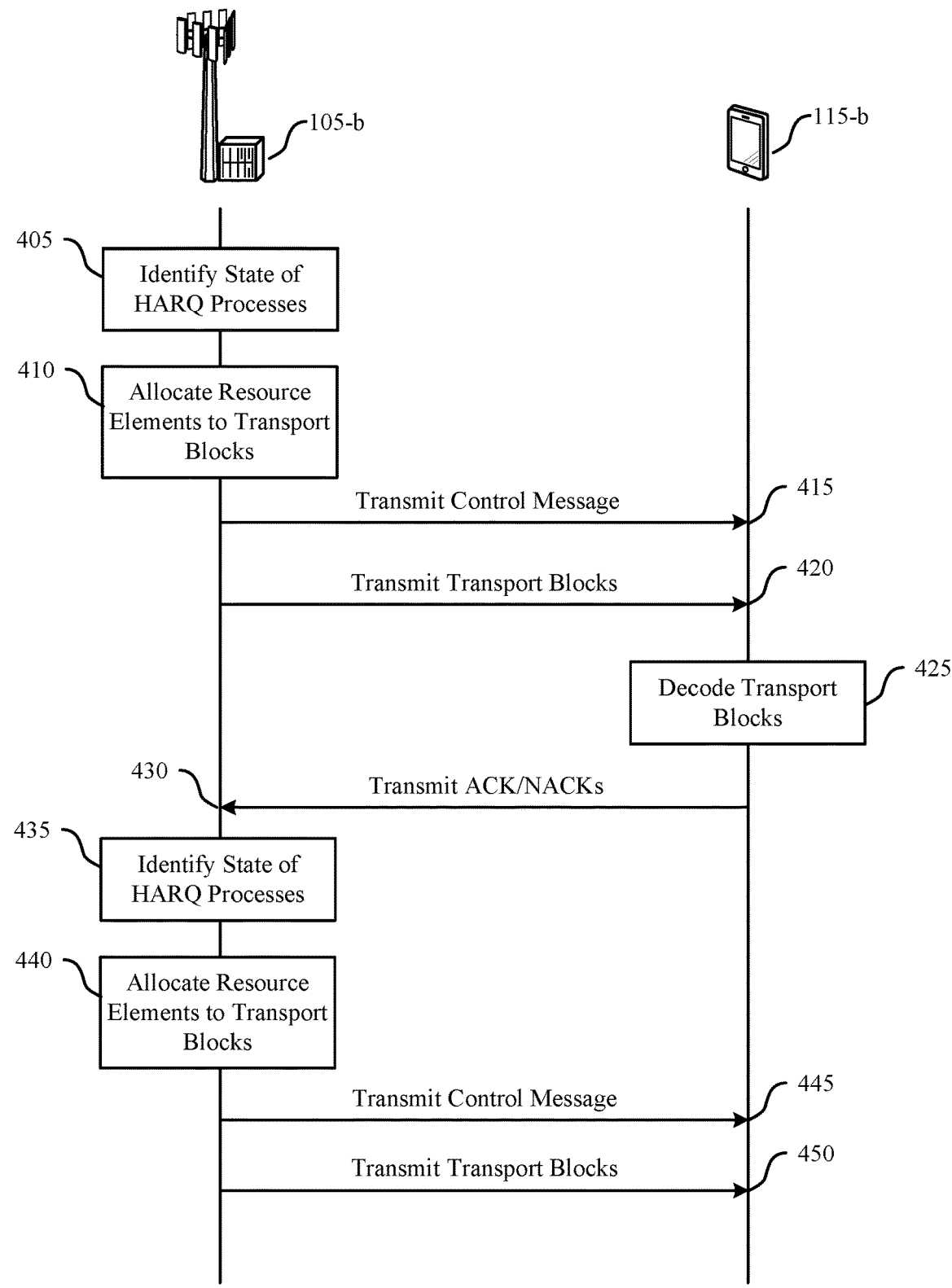
FIG. 4 illustrates an example of a process flow for multiple tri-state HARQ processes in accordance with various aspects of the present disclosure.

FIG. 4 illustrates an example of a process flow 400 for multiple tri-state HARQ processes in accordance with various aspects of the present disclosure. Process flow 400 may be performed by base station 105-b and UE 115-b, which may be examples of a base station 105 and a UE 115 described above with reference to FIGS. 1-3. In some examples, base station 105-b may transmit multiple HARQ process within the same TTI to UE 115-b. UE 115-b may respond with a group ACK/NACK to signal successful or unsuccessful reception or decoding of the transmitted data.

At step 405, base station 105-b may identify the state for each of a plurality of HARQ processes. In some examples, the HARQ state includes a new data indication, a retransmission indication, or an inactive indication. The HARQ state may also include a redundancy version.

At step 410, base station 105-b may allocate resource elements to transport blocks based on the state of the active HARQ processes.

At step 415, base station 105-b may transmit a control message, which may include an indication of the state of the HARQ processes and a resource grant for the associated transport blocks. The resource grant may communicate to UE 115-b what frequency resources are being used, the amount of data being sent, and the allocation and modulation and coding scheme (MCS) to be used for the plurality of transport blocks.

At step 420, base station 105-b may transmit a data signal to UE 115-b including the multiple transport blocks. In some examples, each of the plurality of transport blocks utilizes the same MCS. In some examples, the plurality of transport blocks are transmitted within a single TTI. In some cases, each transport block can have a different MCS.

At step 425, UE 115-b may decode the received plurality of transport blocks based on the control message. UE 115-b may determine whether each transport block is successfully decoded by performing a CRC.

At step 430, UE 115-*b* may respond to base station 105-*b* with ACK/NACKs based on whether each transport block was successfully decoded. For example, UE 115-*b* may transmit a NACK for a transport block after a failure to receive or decode the transport block. UE 115-*b* may send an ACK for a transport block after successful reception and decoding.

At step 435, base station 105-*b* may update the state of the available HARQ processes based on the ACK/NACKs from UE 115-*b*. The updated state may identify a retransmission status, and may include a retransmission indication or a redundancy version, or both. In some cases, the retransmission status may be the result of base station 105-*b* receiving a NACK. In other cases, the retransmission status may be the result of base station 105-*b* failing to correctly receive a NACK. In yet other cases, the retransmission status may be the result of UE 115-*b* failing to send an ACK or NACK.

At step 440, base station 105-*b* may allocate resources for additional transport blocks based on the updated state of the HARQ processes. For example, base station 105-*b* may identify a first set of resources for HARQ processes associated with retransmitted data. In some cases, base station 105-*b* may equally partition a second set of resources between those transport blocks containing new data.

At step 445, base station 105-*b* may transmit a second control message including an indication of the updated state of the HARQ processes corresponding to the second set of transport blocks and the new allocation of resources to UE 115-*b*. UE 115-*b* may then identify the retransmission status for the forthcoming transport blocks based on the second control. UE 115-*b* may also identify a new data status for the forthcoming transmission.

At step 450, base station 105-*b* may transmit a second data signal including a second set of multiple transport blocks based on the second control message.

Figure 5:
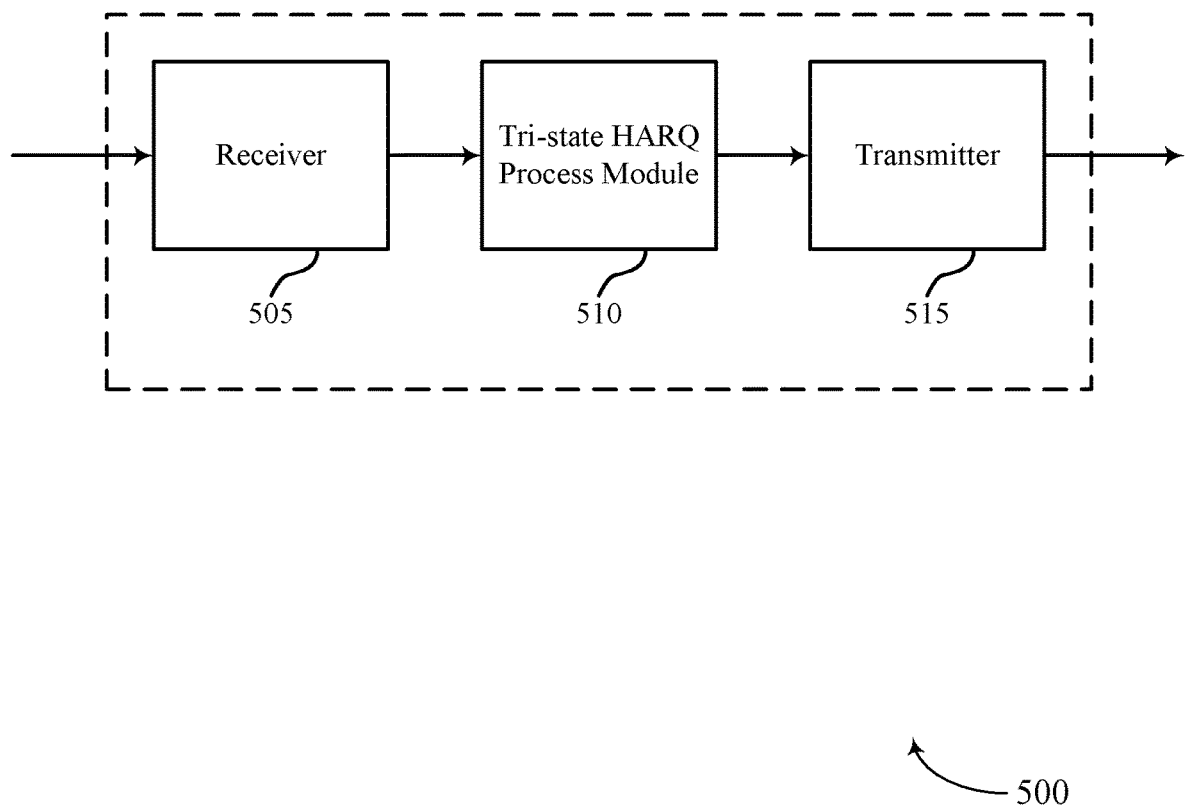
FIGS. 5 through 7 show block diagrams of a wireless device configured for multiple tri-state HARQ processes in accordance with various aspects of the present disclosure.

FIG. 5 shows a block diagram of a wireless device 500 configured for multiple tri-state HARQ processes in accordance with various aspects of the present disclosure. Wireless device 500 may be an example of aspects of a device, such as a UE 115 or base station 105 described with reference to FIGS. 1-4. Wireless device 500 may include a receiver 505, a tri-state HARQ process module 510, or a transmitter 515. Wireless device 500 may also include a processor. Each of these components may be in communication with one another.

The receiver 505 may receive information such as packets, user data, or control information associated with various information channels (e.g., control channels, data channels, and information related to multiple tri-state HARQ processes, etc.). Information may be passed on to the tri-state HARQ process module 510, and to other components of wireless device 500.

The tri-state HARQ process module 510 may identify a state for each of a plurality of HARQ processes. The tri-state HARQ process module 510 may also, in combination with other modules, for instance, transmit a control message including an indication of the state for each of the plurality of HARQ processes, and transmit a data signal including a plurality of transport blocks corresponding to the plurality of HARQ processes based at least in part on the control message.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
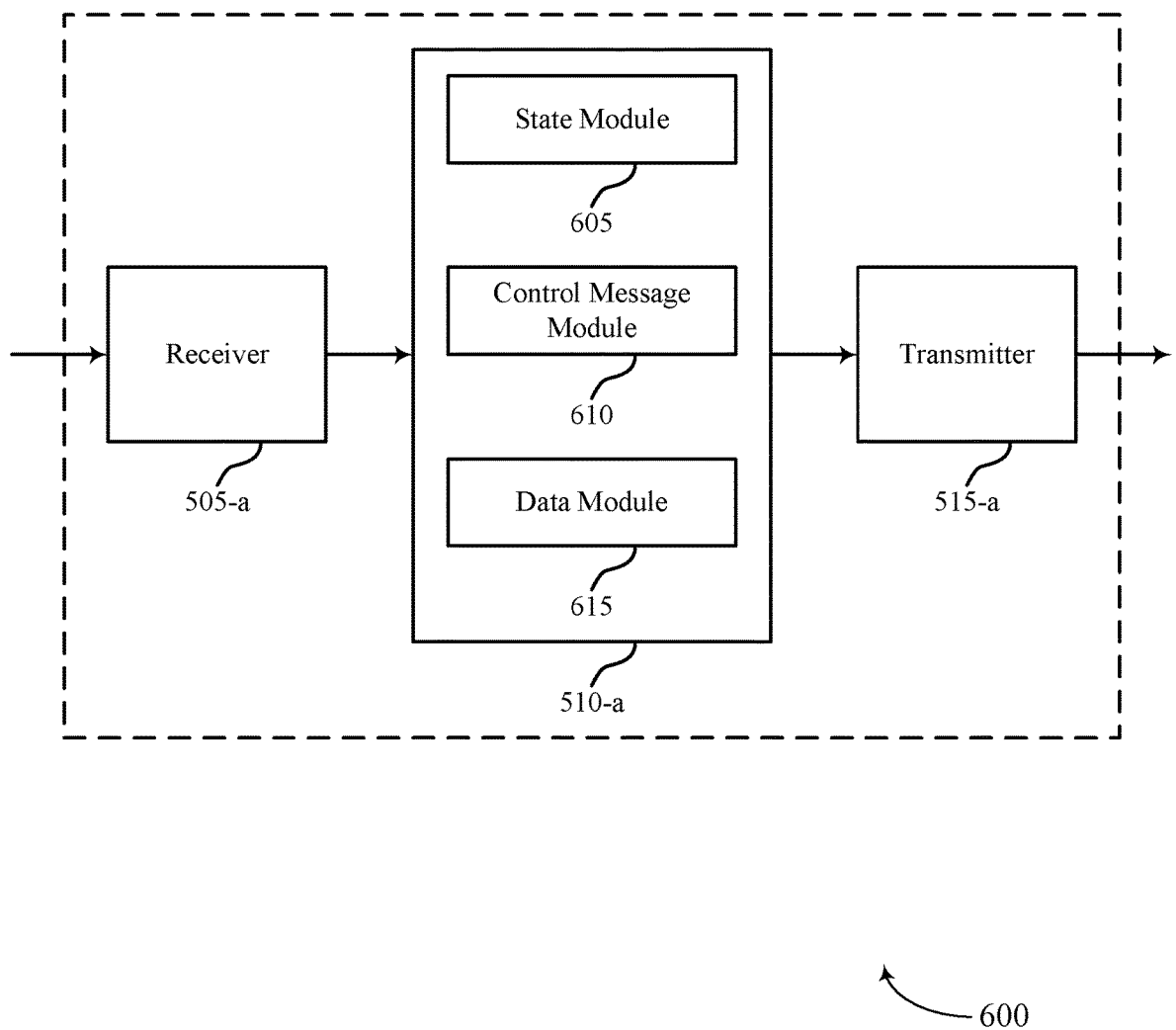

FIG. 6 shows a block diagram of a wireless device 600 for multiple tri-state HARQ processes in accordance with various aspects of the present disclosure. Wireless device 600 may be an example of aspects of a wireless device 500, a UE 115 or a base station 105 described with reference to FIGS. 1-5. Wireless device 600 may include a receiver 505-*a*, a tri-state HARQ process module 510-*a*, or a transmitter 515-*a*. Wireless device 600 may also include a processor. Each of these components may be in communication with one another. The tri-state HARQ process module 510-*a* may also include a state module 605, a control message module 610, and a data module 615.

The receiver 505-*a* may receive information which may be passed on to tri-state HARQ process module 510-*a*, and to other components of wireless device 600. The tri-state HARQ process module 510-*a* may perform the operations described above with reference to FIG. 5. The transmitter 515-*a* may transmit signals received from other components of wireless device 600.

The state module 605 may identify a state for each of a plurality of HARQ processes as described above with reference to FIGS. 2-4. In some examples, the state for each of the plurality of HARQ processes includes a new data indication, a retransmission indication, or an inactive indication. In some examples, the state for a HARQ processes includes a redundancy version.

The control message module 610 may transmit (or receive), or cause wireless device 600 to transmit (or receive), a control message including an indication of the state for each of the plurality of HARQ processes as described above with reference to FIGS. 2-4. The control message module 610 may also transmit a second control message based at least in part on a retransmission status. In some examples, the control message includes a resource grant for the plurality of transport blocks.

The data module 615 may transmit (or receive), or cause wireless device 600 to transmit (or receive), a data signal including a plurality of transport blocks corresponding to a number of HARQ processes, and based on the control message, as described above with reference to FIGS. 2-4. The data module 615 may also transmit a second data signal including a second plurality of transport blocks corresponding to the plurality of HARQ processes based at least in part on the second control message.

Figure 7:
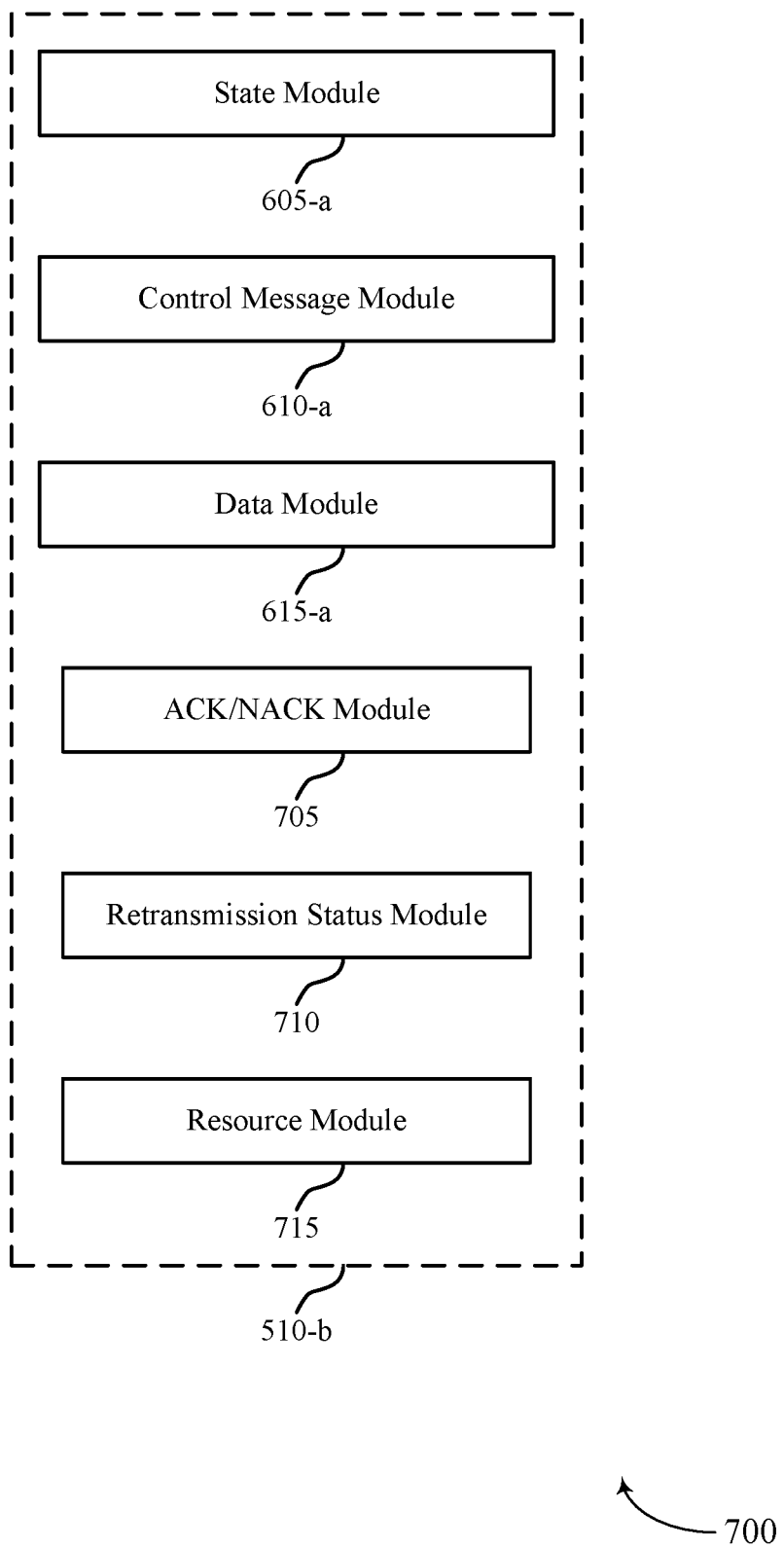

FIG. 7 shows a block diagram 700 of a tri-state HARQ process module 510-*b* which may be a component of a wireless device 500 or a wireless device 600 for multiple tri-state HARQ processes in accordance with various aspects of the present disclosure. The tri-state HARQ process module 510-*b* may be an example of aspects of a tri-state HARQ process module 510 described with reference to FIGS. 5-6. The tri-state HARQ process module 510-*b* may include a state module 605-*a*, a control message module 610-*a*, and a data module 615-*a*. Each of these modules may perform the functions described above with reference to FIG. 6. The tri-state HARQ process module 510-*b* may also include an ACK/NACK module 705, a retransmission status module 710, and a resource module 715. The various modules of tri-state HARQ process module 510-*b* may be in communication with one another.

The ACK/NACK module 705 may transmit (or receive) an ACK or a NACK for each transport block received, as described above with reference to FIGS. 2-4. The ACK/NACK may be sent based on whether a received transport block passes a CRC.

The retransmission status module 710 may identify a retransmission status for each HARQ process of a plurality of HARQ processes, and the retransmission status may include a retransmission indication and a redundancy version, as described above with reference to FIGS. 2-4. The retransmission status module 710 may also identify a second retransmission status based at least in part on a second control message.

The resource module 715 may identify a first set of resources for a subset of a plurality of HARQ processes associated with retransmitted data, as described above with reference to FIGS. 2-4. The resource module 715 may also equally partition a second set of resources for a data signal between a plurality of transport blocks containing new data.

The components of wireless device 500, wireless device 600, or tri-state HARQ process module 510-b may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
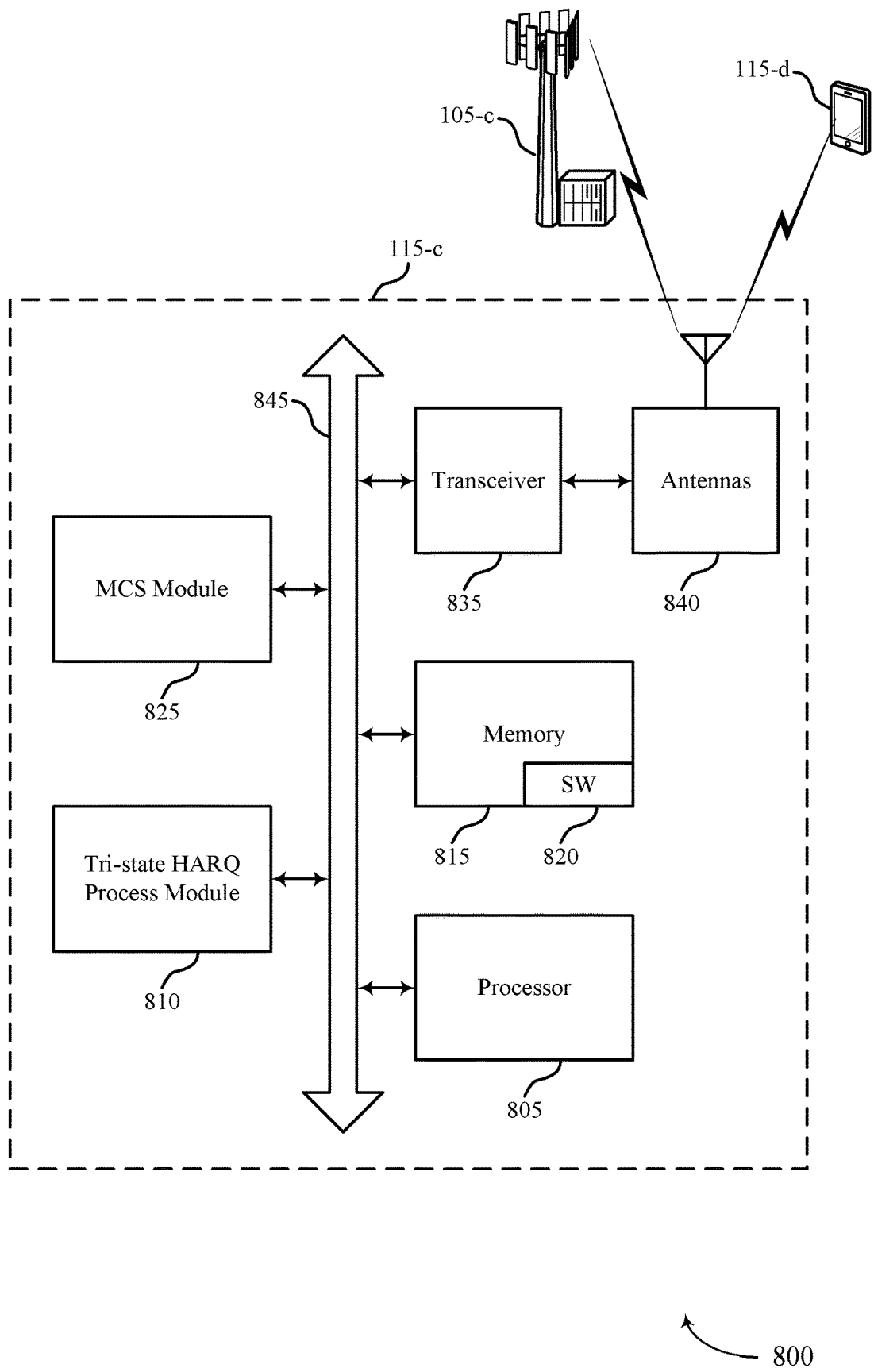
FIG. 8 illustrates a block diagram of a system including a UE configured for multiple tri-state HARQ processes in accordance with various aspects of the present disclosure.

FIG. 8 shows a diagram of a system 800 including a UE configured for multiple tri-state HARQ processes in accordance with various aspects of the present disclosure. System 800 may include UE 115-c, which may be an example of a wireless device 500, a wireless device 600, or a UE 115 described above with reference to FIGS. 1-7. UE 115-c may include a tri-state HARQ process module 810, which may be an example of a tri-state HARQ process module 510 described with reference to FIGS. 5-7. In some examples, UE 115-c includes MCS module 825. UE 115-c may also include components for bi-directional voice and data communications including components for transmitting communications and components for receiving communications. For example, UE 115-c may communicate bi-directionally with base station 105-c or UE 115-d.

The MCS module 825 may be configured to determine an MCS for each transport block. In some cases, each of a plurality of transport blocks utilizes the same MCS as described above with reference to FIGS. 2-4. In some examples, each of the plurality of transport blocks utilizes the same MCS.

UE 115-c may also include a processor 805, and memory 815 (including software (SW) 820), a transceiver module 835, and one or more antenna(s) 840, each of which may communicate, directly or indirectly, with one another (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., multiple tri-state HARQ processes, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
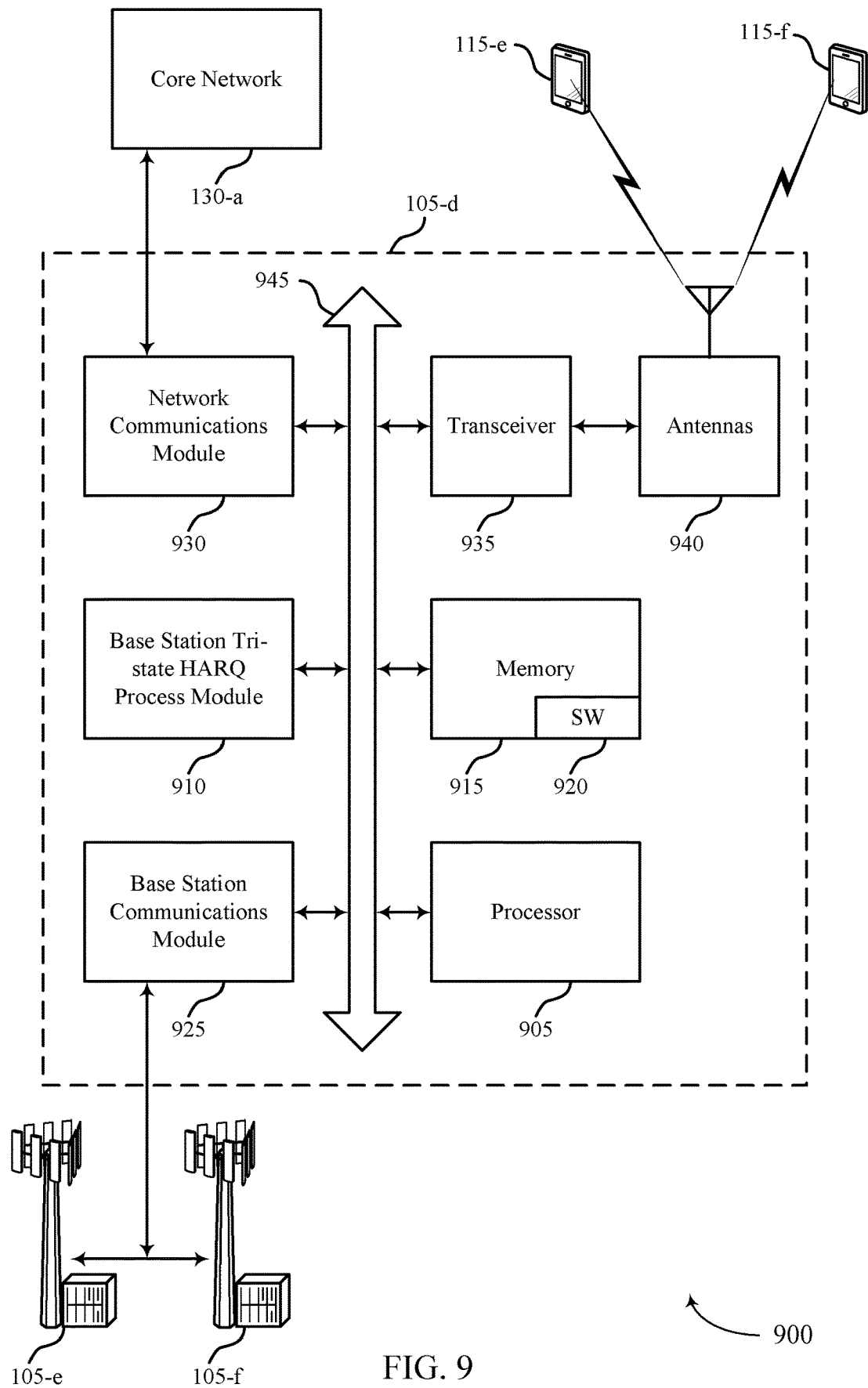
FIG. 9 illustrates a block diagram of a system including a base station configured for multiple tri-state HARQ processes in accordance with various aspects of the present disclosure.

FIG. 9 shows a diagram of a system 900 including a base station configured for multiple tri-state HARQ processes in accordance with various aspects of the present disclosure. System 900 may include base station 105-e, which may be an example of a wireless device 500, a wireless device 600, or a base station 105 described above with reference to FIGS. 1-8. Base station 105-d may include a base station tri-state HARQ process module 910, which may be an example of a base station tri-state HARQ process module 910 described with reference to FIGS. 6-8. Base station 105-d may also include components for bi-directional voice and data communications including components for transmitting communications and components for receiving communications. For example, base station 105-d may communicate bi-directionally with base station 105-e and base station 105-f or UE 115-e and UE 115-f.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-d or 105-e utilizing base station communication module 925. In some examples, base station communication module 925 may provide an X2 interface within an LTE/LTE-A wireless communication network technology to provide communication between some of the base stations 105. In some examples, base station 105-d may communicate with other base stations through core network 130. Additionally or alternatively, base station 105-d may communicate with the core network 130 through network communications module 930.

The base station 105-d may include a processor 905, memory 915 (including software (SW) 920), transceiver modules 935, and antenna(s) 940, which each may be in communication, directly or indirectly, with one another (e.g., over bus system 945). The transceiver modules 935 may be configured to communicate bi-directionally, via the antenna(s) 940, with the UEs 115, which may be multi-mode devices. The transceiver module 935 (or other components of the base station 105-d) may also be configured to communicate bi-directionally, via the antennas 940, with one or more other base stations (not shown). The transceiver module 935 may include a modem configured to modulate the packets and provide the modulated packets to the antennas 940 for transmission, and to demodulate packets received from the antennas 940. The base station 105-d may include multiple transceiver modules 935, each with one or more associated antennas 940. The transceiver module may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., multiple tri-state HARQ processes, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. The communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

Figure 10:
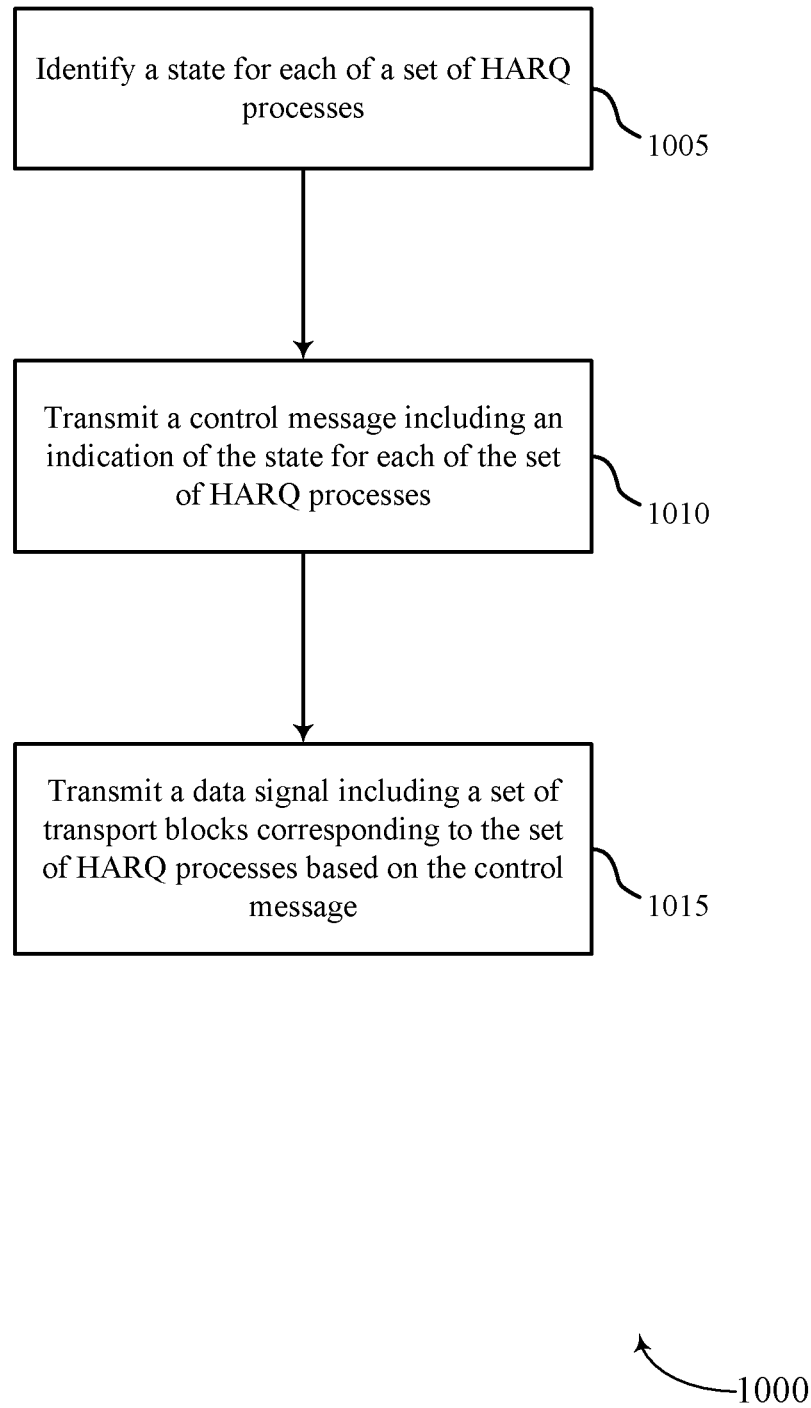
FIGS. 10 through 15 show flowcharts illustrating a method for multiple tri-state HARQ processes in accordance with various aspects of the present disclosure.

FIG. 10 shows a flowchart illustrating a method 1000 for multiple tri-state HARQ processes in accordance with various aspects of the present disclosure. The operations of method 1000 may be implemented by a wireless device such as a UE 115 or base station 105 or their components, which may include wireless device 500 or wireless device 600, as described with reference to FIGS. 1-9. For example, the operations of method 1000 may be performed by the tri-state HARQ process module 510 as described with reference to FIGS. 5-8. In some examples, a device may execute a set of codes to control the functional elements of the device to perform the functions described below. Additionally or alternatively, the device may perform aspects of the functions described below using special-purpose hardware.

At block 1005, the device may identify a state for each of a plurality of HARQ processes as described above with reference to FIGS. 2-4. In certain examples, the operations of block 1005 may be performed by the state module 605 as described above with reference to FIG. 6.

At block 1010, the device may transmit a control message including an indication of the state for each of the plurality of HARQ processes as described above with reference to FIGS. 2-4. In certain examples, the operations of block 1010 may be performed by the control message module 610 as described above with reference to FIG. 6.

At block 1015, the device may transmit a data signal including a plurality of transport blocks corresponding to the plurality of HARQ processes based at least in part on the control message as described above with reference to FIGS. 2-4. In certain examples, the operations of block 1015 may be performed by the data module 615 as described above with reference to FIG. 6.

Figure 11:
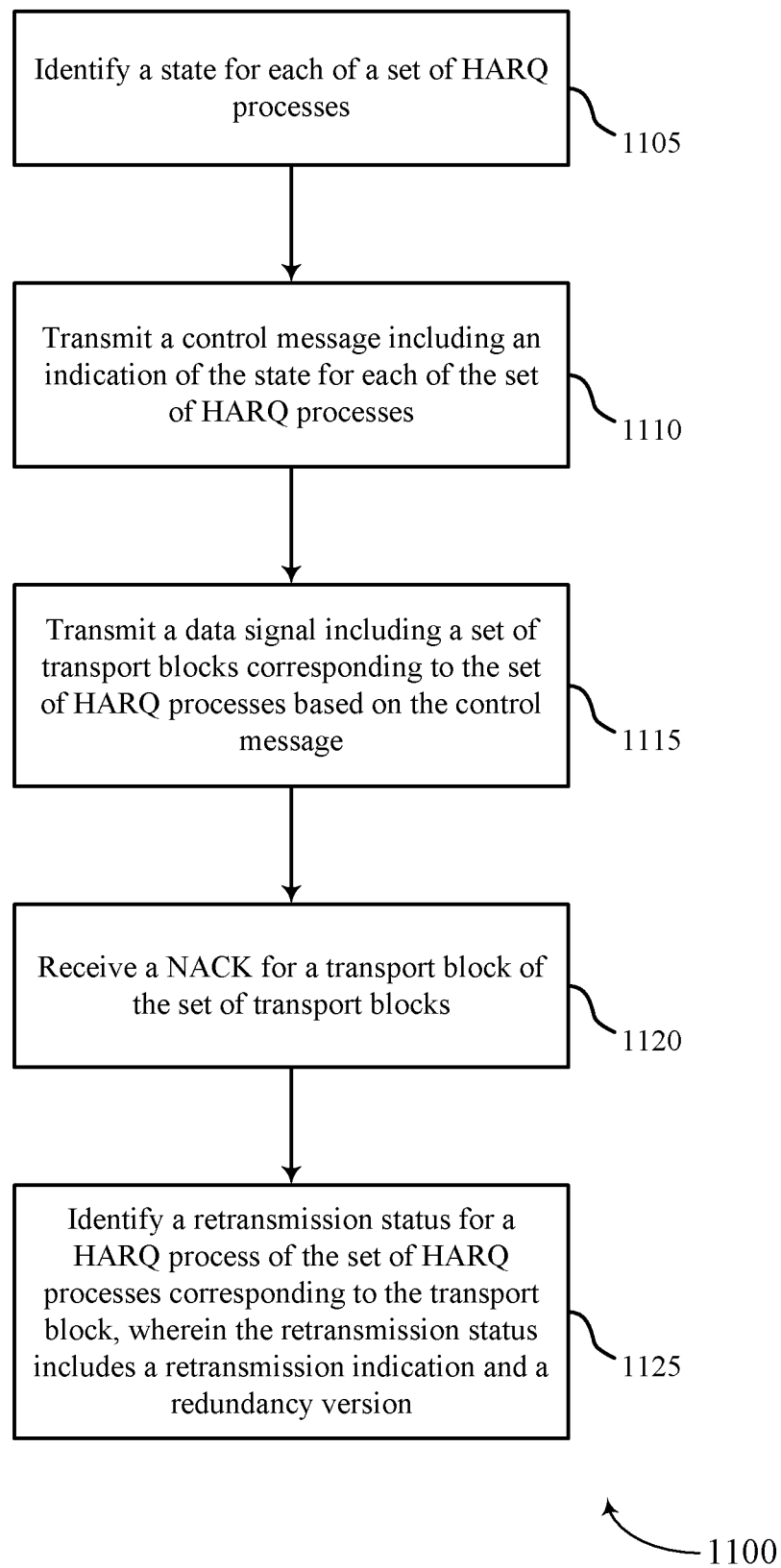

FIG. 11 shows a flowchart illustrating a method 1100 for multiple tri-state HARQ processes in accordance with various aspects of the present disclosure. The operations of method 1100 may be implemented by a wireless device such as a UE 115 or base station 105 or their components, which may include wireless device 500 or wireless device 600, as described with reference to FIGS. 1-9. For example, the operations of method 1100 may be performed by the tri-state HARQ process module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may identify a state for each of a plurality of HARQ processes as described above with reference to FIGS. 2-4. In certain examples, the operations of block 1105 may be performed by the state module 605 as described above with reference to FIG. 6.

At block 1110, the device may transmit a control message including an indication of the state for each of the plurality of HARQ processes as described above with reference to FIGS. 2-4. In certain examples, the operations of block 1110 may be performed by the control message module 610 as described above with reference to FIG. 6.

At block 1115, the device may transmit a data signal including a plurality of transport blocks corresponding to the plurality of HARQ processes based at least in part on the control message as described above with reference to FIGS. 2-4. In certain examples, the operations of block 1115 may be performed by the data module 615 as described above with reference to FIG. 6.

At block 1120, the device may receive a NACK for a transport block of the plurality of transport blocks as described above with reference to FIGS. 2-4. In certain examples, the operations of block 1120 may be performed by the ACK/NACK module 705 as described above with reference to FIG. 7.

At block 1125, the device may identify a retransmission status for a HARQ process of the plurality of HARQ processes corresponding to the transport block, and the retransmission status may include a retransmission indication and a redundancy version as described above with reference to FIGS. 2-4. In certain examples, the operations of block 1125 may be performed by the retransmission status module 710 as described above with reference to FIG. 7.

Figure 12:
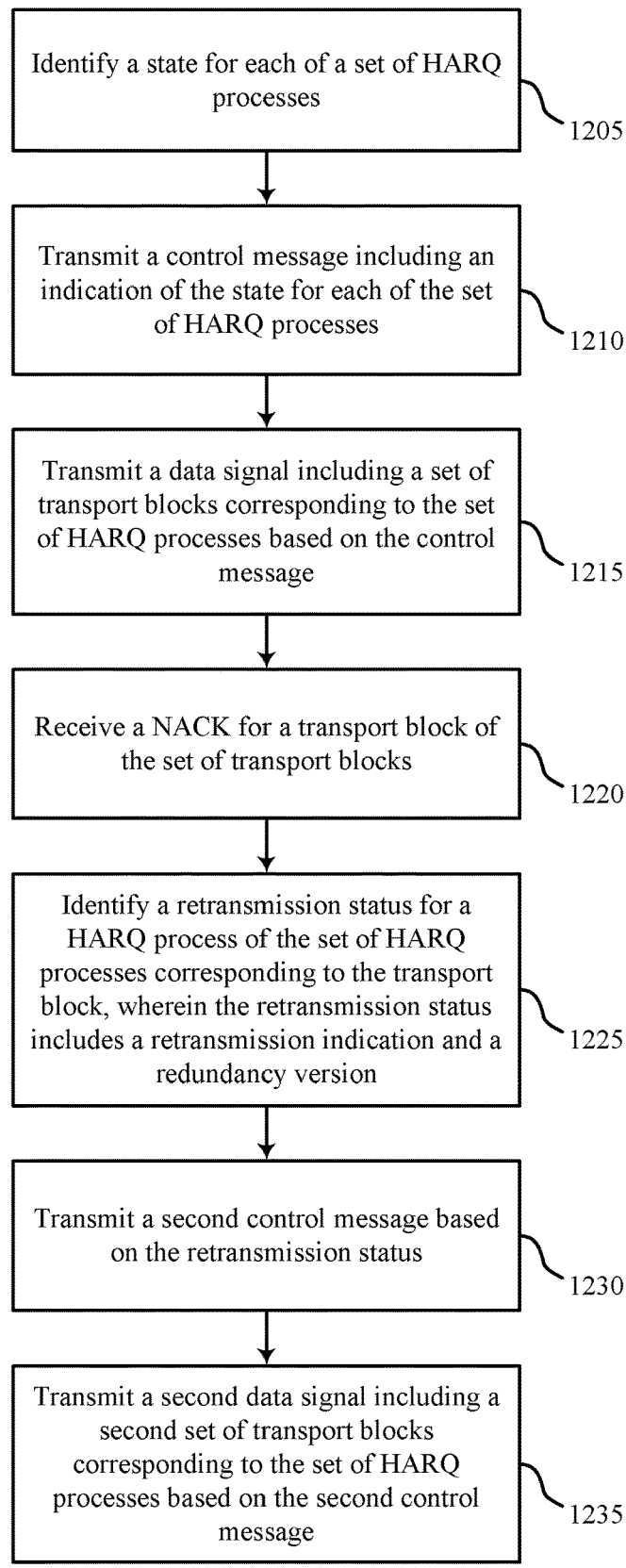

FIG. 12 shows a flowchart illustrating a method 1200 for multiple tri-state HARQ processes in accordance with various aspects of the present disclosure. The operations of method 1200 may be implemented by a wireless device such as a UE 115 or base station 105 or their components, which may include wireless device 500 or wireless device 600, as described with reference to FIGS. 1-9. For example, the operations of method 1200 may be performed by the tri-state HARQ process module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1200 may also incorporate aspects of methods 1000 or 1100 of FIGS. 10 and 11.

At block 1205, the device may identify a state for each of a plurality of HARQ processes as described above with reference to FIGS. 2-4. In certain examples, the operations of block 1205 may be performed by the state module 605 as described above with reference to FIG. 6.

At block 1210, the device may transmit a control message including an indication of the state for each of the plurality of HARQ processes as described above with reference to FIGS. 2-4. In certain examples, the operations of block 1210 may be performed by the control message module 610 as described above with reference to FIG. 6.

At block 1215, the device may transmit a data signal including a plurality of transport blocks corresponding to the plurality of HARQ processes based at least in part on the control message as described above with reference to FIGS.

2-4. In certain examples, the operations of block 1215 may be performed by the data module 615 as described above with reference to FIG. 6.

At block 1220, the device may receive a NACK for a transport block of the plurality of transport blocks as described above with reference to FIGS. 2-4. In certain examples, the operations of block 1220 may be performed by the ACK/NACK module 705 as described above with reference to FIG. 7.

At block 1225, the device may identify a retransmission status for a HARQ process of the plurality of HARQ processes corresponding to the transport block, and the retransmission status may include a retransmission indication and a redundancy version as described above with reference to FIGS. 2-4. In certain examples, the operations of block 1225 may be performed by the retransmission status module 710 as described above with reference to FIG. 7.

At block 1230, the device may transmit a second control message based at least in part on the retransmission status as described above with reference to FIGS. 2-4. In certain examples, the operations of block 1230 may be performed by the control message module 610 as described above with reference to FIG. 6.

At block 1235, the device may transmit a second data signal including a second plurality of transport blocks corresponding to the plurality of HARQ processes based at least in part on the second control message as described above with reference to FIGS. 2-4. In certain examples, the operations of block 1235 may be performed by the data module 615 as described above with reference to FIG. 6.

Figure 13:
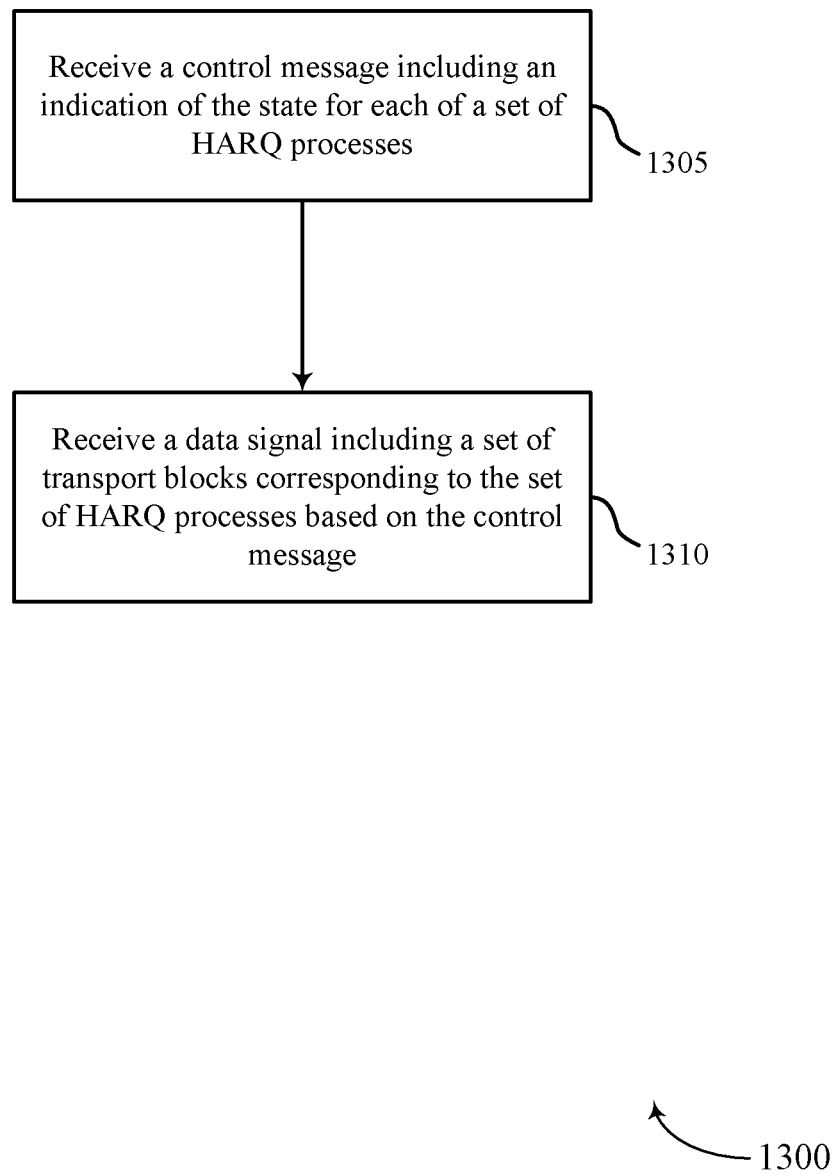

FIG. 13 shows a flowchart illustrating a method 1300 for multiple tri-state HARQ processes in accordance with various aspects of the present disclosure. The operations of method 1300 may be implemented by a wireless device such as a UE 115 or base station 105 or their components, which may include wireless device 500 or wireless device 600, as described with reference to FIGS. 1-9. For example, the operations of method 1300 may be performed by the tri-state HARQ process module 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1305, the device may receive a control message including an indication of the state for each of a plurality of HARQ processes as described above with reference to FIGS. 2-4. In certain examples, the operations of block 1305 may be performed by the control message module 610 as described above with reference to FIG. 6.

At block 1310, the device may receive a data signal including a plurality of transport blocks corresponding to the plurality of HARQ processes based at least in part on the control message as described above with reference to FIGS. 2-4. In certain examples, the operations of block 1310 may be performed by the data module 615 as described above with reference to FIG. 6.

Figure 14:
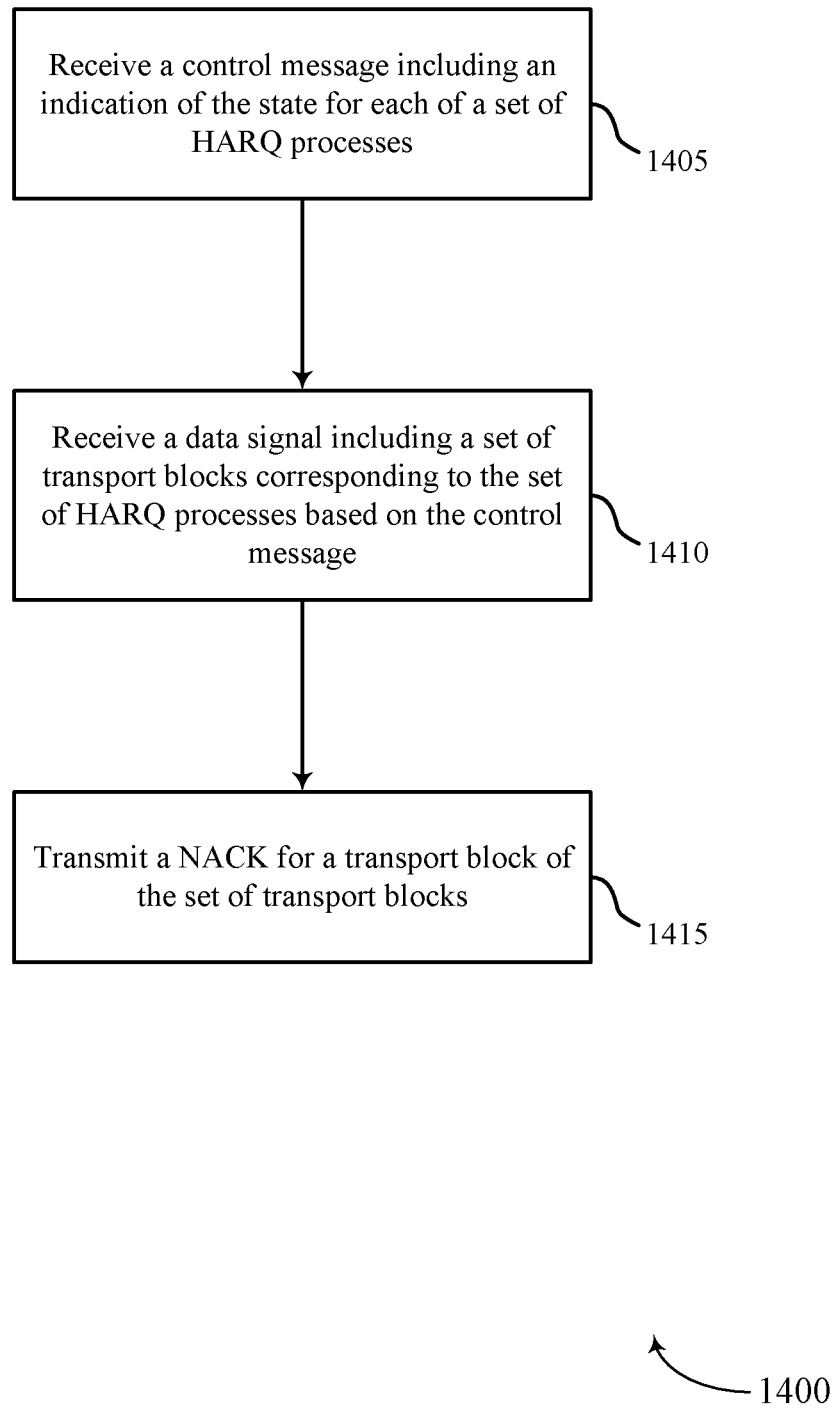

FIG. 14 shows a flowchart illustrating a method 1400 for multiple tri-state HARQ processes in accordance with various aspects of the present disclosure. The operations of method 1400 may be implemented by a wireless device such as a UE 115 or base station 105 or their components, which may include wireless device 500 or wireless device 600, as described with reference to FIGS. 1-9. For example, the operations of method 1400 may be performed by the tri-state HARQ process module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1400 may also incorporate aspects of methods 1300 of FIG. 13.

At block 1405, the device may receive a control message including an indication of the state for each of a plurality of HARQ processes as described above with reference to FIGS. 2-4. In certain examples, the operations of block 1405 may be performed by the control message module 610 as described above with reference to FIG. 6.

At block 1410, the device may receive a data signal including a plurality of transport blocks corresponding to the plurality of HARQ processes based at least in part on the control message as described above with reference to FIGS. 2-4. In certain examples, the operations of block 1410 may be performed by the data module 615 as described above with reference to FIG. 6.

At block 1415, the device may transmit a NACK for a transport block of the plurality of transport blocks as described above with reference to FIGS. 2-4. In certain examples, the operations of block 1415 may be performed by the ACK/NACK module 705 as described above with reference to FIG. 7.

Figure 15:
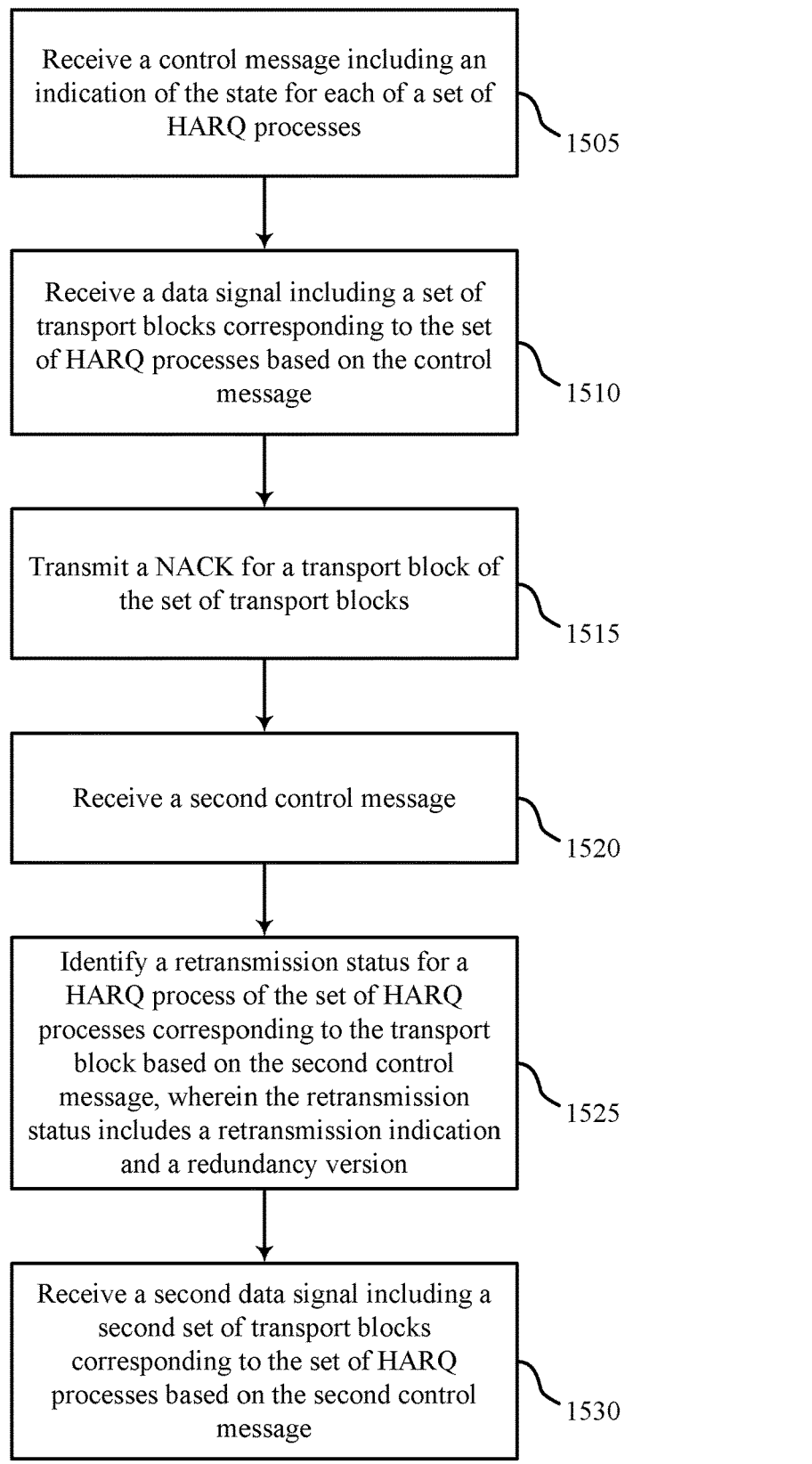

FIG. 15 shows a flowchart illustrating a method 1500 for multiple tri-state HARQ processes in accordance with various aspects of the present disclosure. The operations of method 1500 may be implemented by a wireless device such as a UE 115 or base station 105 or their components, which may include wireless device 500 or wireless device 600, as described with reference to FIGS. 1-9. For example, the operations of method 1500 may be performed by the tri-state HARQ process module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1500 may also incorporate aspects of methods 1300 or 1400 of FIGS. 13 and 14.

At block 1505, the device may receive a control message including an indication of the state for each of a plurality of HARQ processes as described above with reference to FIGS. 2-4. In certain examples, the operations of block 1505 may be performed by the control message module 610 as described above with reference to FIG. 6.

At block 1510, the device may receive a data signal including a plurality of transport blocks corresponding to the plurality of HARQ processes based at least in part on the control message as described above with reference to FIGS. 2-4. In certain examples, the operations of block 1510 may be performed by the data module 615 as described above with reference to FIG. 6.

At block 1515, the device may transmit a NACK for a transport block of the plurality of transport blocks as described above with reference to FIGS. 2-4. In certain examples, the operations of block 1515 may be performed by the ACK/NACK module 705 as described above with reference to FIG. 7.

At block 1520, the device may receive a second control message as described above with reference to FIGS. 2-4. In certain examples, the operations of block 1520 may be performed by the control message module 610 as described above with reference to FIG. 6.

At block 1525, the device may identify a retransmission status for a HARQ process of the plurality of HARQ processes corresponding to the transport block based at least in part on the second control message, and the retransmission status may include a retransmission indication and a redundancy version as described above with reference to FIGS. 2-4. In certain examples, the operations of block 1525 may be performed by the retransmission status module 710 as described above with reference to FIG. 7.

At block 1530, the device may receive a second data signal including a second plurality of transport blocks corresponding to the plurality of HARQ processes based at least in part on the second control message as described above with reference to FIGS. 2-4. In certain examples, the operations of block 1530 may be performed by the data module 615 as described above with reference to FIG. 6.

Thus, methods 1000, 1100, 1200, 1300, 1400, and 1500 may provide for multiple tri-state HARQ processes. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes example configurations and does not represent all the examples that may be implemented or that are within the scope of the claims. The term "exemplary," as may be used herein, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communication at a wireless device, comprising:
    identifying for each of a plurality of hybrid automatic repeat request (HARQ) processes an active indication or an inactive indication, wherein each of the plurality of HARQ processes is associated with a plurality of transport blocks to be transmitted in a data signal during a first transmission time interval (TTI);
    determining for HARQ processes of the plurality of HARQ processes associated with the active indication, a new transmission state or a retransmission state;
    transmitting a control message for the data signal comprising the plurality of transport blocks to be transmitted during the first TTI, the control message comprising a plurality of HARQ process indications, wherein each HARQ process indication indicates one of the new transmission state or the retransmission state for each of the HARQ processes associated with the active indication; and
    transmitting the data signal comprising the plurality of transport blocks during the first TTI, wherein each of the plurality of transport blocks corresponds to at least one of the new transmission state, the retransmission state or the inactive indication based at least in part on the control message.

2. The method of claim 1, further comprising:
    receiving a negative acknowledgement (NACK) for a transport block of the plurality of transport blocks; and
    identifying a retransmission status for a HARQ process of the plurality of HARQ processes corresponding to the transport block, wherein the retransmission status comprises the retransmission state and a redundancy version.

3. The method of claim 2, further comprising:
    transmitting a second control message based at least in part on the retransmission status; and
    transmitting a second data signal comprising a second plurality of transport blocks corresponding to the plurality of HARQ processes based at least in part on the second control message.

4. The method of claim 1, wherein the retransmission state for at least one of the plurality of HARQ processes comprises a redundancy version.

5. The method of claim 1, wherein the control message comprises a resource grant for the plurality of transport blocks.

6. The method of claim 1, wherein each of the plurality of transport blocks utilizes a same modulation and coding scheme (MCS).

7. The method of claim 1, further comprising:
    identifying a first set of resources for a subset of the plurality of HARQ processes associated with retransmitted data.

8. The method of claim 7, further comprising:
    equally partitioning a second set of resources for the data signal between a second plurality of transport blocks containing new data.

9. A method of communication at a wireless device, comprising:
    receiving a control message for a data signal comprising a plurality of transport blocks to be transmitted during a first transmission time interval (TTI), the control message comprising a plurality of HARQ process indications, wherein each HARQ process indication indicates one of a new transmission state or a retransmission state for each of a plurality of HARQ processes associated with an active indication and wherein each HARQ process indication is based at least in part on an identification of the active indication or an inactive indication for each of the plurality of HARQ processes; and
    receiving the data signal comprising the plurality of transport blocks during the first TTI, wherein each of the plurality of transport blocks corresponds to at least one of the new transmission state, the retransmission state or an inactive indication based at least in part on the control message, wherein the new transmission state or the retransmission state are based at least in part on a determination for each of the plurality of HARQ processes associated with the active indication.

10. The method of claim 9, further comprising:
    transmitting a NACK for a transport block of the plurality of transport blocks.

11. The method of claim 10, further comprising:
    receiving a second control message;
    identifying a retransmission status for a HARQ process of the plurality of HARQ processes corresponding to the transport block based at least in part on the second control message, wherein the retransmission status comprises the retransmission state and a redundancy version; and
    receiving a second data signal comprising a second plurality of transport blocks corresponding to the plurality of HARQ processes based at least in part on the second control message.

12. The method of claim 9, wherein the retransmission state for at least one of the plurality of HARQ processes comprises a redundancy version.

13. The method of claim 9, wherein each of the plurality of transport blocks utilizes a same MCS.

14. An apparatus for communication at a wireless device, comprising:
a processor;
memory in electronic communication with the processor; and
instructions stored in the memory;
wherein the instructions are executable by the processor to:
identify for each of a plurality of hybrid automatic repeat request (HARQ) processes an active indication or an inactive indication, wherein each of the plurality of HARQ processes is associated with a plurality of transport blocks to be transmitted in a data signal during a first transmission time interval (TTI);
determining for HARQ processes of the plurality of HARQ processes associated with the active indication, a new transmission state or a retransmission state;
transmit a control message for the data signal comprising the plurality of transport blocks to be transmitted during the first TTI, the control message comprising a plurality of HARQ process indications, wherein each HARQ process indication indicates one of the new transmission state or the retransmission state for each of the HARQ processes associated with the active indication; and
transmit the data signal comprising the plurality of transport blocks during the first TTI, wherein each of the plurality of transport blocks corresponds to at least one of the HARQ processes associated with the active indication based at least in part on the control message.

15. The apparatus of claim 14, wherein the instructions are executable by the processor to:
receive a negative acknowledgement (NACK) for a transport block of the plurality of transport blocks; and
identify a retransmission status for a HARQ process of the plurality of HARQ processes corresponding to the transport block, wherein the retransmission status comprises the retransmission state and a redundancy version.

16. The apparatus of claim 15, wherein the instructions are executable by the processor to:
transmit a second control message based at least in part on the retransmission status; and
transmit a second data signal comprising a second plurality of transport blocks corresponding to the plurality of HARQ processes based at least in part on the second control message.

17. The apparatus of claim 14, wherein the retransmission state for at least one of the plurality of HARQ processes comprises a redundancy version.

18. The apparatus of claim 14, wherein the control message comprises a resource grant for the plurality of transport blocks.

19. The apparatus of claim 14, wherein each of the plurality of transport blocks utilizes a same modulation and coding scheme (MCS).

20. The apparatus of claim 14, wherein the instructions are executable by the processor to:
identify a first set of resources for a subset of the plurality of HARQ processes associated with retransmitted data.

21. The apparatus of claim 20, wherein the instructions are executable by the processor to:
equally partition a second set of resources for the data signal between a second plurality of transport blocks containing new data.

22. An apparatus for communication at a wireless device, comprising:
a processor;
memory in electronic communication with the processor; and
instructions stored in the memory;
wherein the instructions are executable by the processor to:
receive a control message for a data signal comprising a plurality of transport blocks to be transmitted during a first transmission time interval (TTI), the control message comprising a plurality of HARQ process indications, wherein each HARQ process indication indicates one of a new transmission state or a retransmission state for each of a plurality of HARQ processes associated with an active indication and wherein each HARQ process indication is based at least in part on an identification of the active indication or an inactive indication for each of the plurality of HARQ processes; and
receive the data signal comprising the plurality of transport blocks during the first TTI, wherein each of the plurality of transport blocks corresponds to at least one of the new transmission state, the retransmissions state or an inactive indication based at least in part on the control message, wherein the new transmission state or the retransmission state are based at least in part on a determination for each of the plurality of HARQ processes associated with the active indication.

23. The apparatus of claim 22, wherein the instructions are executable by the processor to:
transmit a NACK for a transport block of the plurality of transport blocks.

24. The apparatus of claim 23, wherein the instructions are executable by the processor to:
receive a second control message;
identify a retransmission status for a HARQ process of the plurality of HARQ processes corresponding to the transport block based at least in part on the second control message, wherein the retransmission status comprises the retransmission state and a redundancy version; and
receive a second data signal comprising a second plurality of transport blocks corresponding to the plurality of HARQ processes based at least in part on the second control message.

25. The apparatus of claim 22, wherein the retransmission state for at least one of the plurality of HARQ processes comprises a redundancy version.

26. The apparatus of claim 22, wherein each of the plurality of transport blocks utilizes a same MCS.

* * * * *